US009845391B2

(12) United States Patent
Lehmann et al.

(10) Patent No.: US 9,845,391 B2
(45) Date of Patent: Dec. 19, 2017

(54) SURFACE TREATMENT OF PARTICLES AND THEIR USE

(71) Applicants: Kathrin Lehmann, Leverkusen (DE); Angela Nawracala, Bergisch Gladbach (DE); Frauke Henning, Essen (DE); Christian Mund, Essen (DE)

(72) Inventors: Kathrin Lehmann, Leverkusen (DE); Angela Nawracala, Bergisch Gladbach (DE); Frauke Henning, Essen (DE); Christian Mund, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/106,718

(22) PCT Filed: Dec. 11, 2014

(86) PCT No.: PCT/EP2014/077307
§ 371 (c)(1),
(2) Date: Jun. 20, 2016

(87) PCT Pub. No.: WO2015/091177
PCT Pub. Date: Jun. 25, 2015

(65) Prior Publication Data
US 2016/0362556 A1 Dec. 15, 2016

(30) Foreign Application Priority Data
Dec. 20, 2013 (DE) .................. 10 2013 226 798

(51) Int. Cl.
*C09C 3/12* (2006.01)
*C08L 23/12* (2006.01)
*C08K 9/06* (2006.01)
*C09C 1/36* (2006.01)
*C09C 1/30* (2006.01)
*C09K 21/14* (2006.01)
*C08L 23/06* (2006.01)
*C08L 77/00* (2006.01)
*C08L 83/04* (2006.01)
*C08K 3/22* (2006.01)

(52) U.S. Cl.
CPC .................. *C09C 3/12* (2013.01); *C08K 9/06* (2013.01); *C08L 23/12* (2013.01); *C09C 1/3081* (2013.01); *C09C 1/3684* (2013.01); *C09K 21/14* (2013.01); *C01P 2006/60* (2013.01); *C08K 2003/2224* (2013.01); *C08K 2003/2227* (2013.01); *C08L 23/06* (2013.01); *C08L 77/00* (2013.01); *C08L 83/04* (2013.01)

(58) Field of Classification Search
CPC . C08J 3/226; C09C 1/06; C09C 1/027; C09C 1/3684
USPC ....................................... 428/403
See application file for complete search history.

(56) References Cited

U.S. PATENT DOCUMENTS

| | | | |
|---|---|---|---|
| 5,387,467 A | 2/1995 | Hoehner et al. | |
| 5,686,012 A | 11/1997 | Hayashi et al. | |
| 6,630,745 B1* | 10/2003 | Osada | C08L 63/00 257/793 |
| 6,858,663 B2 | 2/2005 | Knott et al. | |
| 7,018,458 B2 | 3/2006 | Knott et al. | |
| 7,118,619 B2 | 10/2006 | Brandt et al. | |
| 7,399,487 B2 | 7/2008 | Batz-Sohn et al. | |
| 7,442,724 B2 | 10/2008 | Esselborn et al. | |
| 7,598,215 B2 | 10/2009 | Hinrichs et al. | |
| 7,619,035 B2 | 11/2009 | Henning et al. | |
| 7,645,335 B2 | 1/2010 | Lortz et al. | |
| 7,759,402 B2 | 7/2010 | Venzmer et al. | |
| 7,829,647 B2 | 11/2010 | Brueckner et al. | |
| 8,138,294 B2 | 3/2012 | Henning et al. | |
| 8,172,936 B2 | 5/2012 | Herrwerth et al. | |
| 8,202,935 B2 | 6/2012 | Alzer et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,334,355 B2 | 12/2012 | Henning et al. | |
| 8,362,095 B2 | 1/2013 | Schwab et al. | |
| 8,420,748 B2 | 4/2013 | Henning et al. | |
| 8,598,295 B2 | 12/2013 | Henning et al. | |
| 8,623,984 B2 | 1/2014 | Henning et al. | |
| 8,779,079 B2 | 7/2014 | Henning et al. | |
| 8,841,400 B2 | 9/2014 | Henning et al. | |
| 8,946,369 B2 | 2/2015 | Henning et al. | |
| 8,962,728 B2 | 2/2015 | Khrenov et al. | |
| 9,005,361 B2 | 4/2015 | Henning et al. | |
| 2011/0207650 A1* | 8/2011 | Rautschek | B01D 19/0404 510/405 |

FOREIGN PATENT DOCUMENTS

DE 10 2008 031 901 A1 1/2010
EP 0 141 174 A1 5/1985
(Continued)

OTHER PUBLICATIONS

Machine translation of JP 2008-007562 (no date).*
U.S. Appl. No. 09/827,584, filed Apr. 5, 2001, US2002-0019459 A1, Gerhard Albrecht.
U.S. Appl. No. 10/456,277, filed Jun. 6, 2003, US2003-0228271 A1, Christop Batz-Sohn, et al.
U.S. Appl. No. 11/509,741, filed Aug. 25, 2006, US2007-0199477 A1, Sven Hill, et al.
U.S. Appl. No. 12/571,493, filed Oct. 1, 2009, US2010-0022435 A1, Frauke Henning, et al.
U.S. Appl. No. 11/909,179, filed Sep. 20, 2007, US2008-0188673 A1, Kathrin Lehmann, et al.
U.S. Appl. No. 11/771,496, filed Jun. 29, 2007, US2008-0125503 A1, Frauke Henning, et al.

(Continued)

*Primary Examiner* — Marc Zimmer
(74) *Attorney, Agent, or Firm* — Oblon, McClelland, Maier & Neustadt, L.L.P.

(57) ABSTRACT

The invention relates to polymer compositions containing inorganic or organic particles which either have been surface-treated before the production of the compositions or are dispersed by special polyether-modified siloxanes through the production of the compositions.

15 Claims, No Drawings

(56) References Cited

FOREIGN PATENT DOCUMENTS

| EP | 0 265 807 | A2 |   | 5/1988 |
|----|-----------|----|---|--------|
| GB | 1 348 372 | A1 |   | 3/1974 |
| HU | 216 858   | B1 |   | 9/1999 |
| JP | 8-120191  | A  |   | 5/1996 |
| JP | 2008-007562 | | * | 1/2008 |
| RU | 2 268 904 | C2 |   | 1/2006 |
| RU | 2 404 220 | C2 |   | 11/2010 |

OTHER PUBLICATIONS

U.S. Appl. No. 12/520,288, filed Jun. 19, 2009, US2010-0029587 A1, Arndt Brueckner, et al.

U.S. Appl. No. 13/650,221, filed Oct. 12, 2012, US2013-0041115 A1, Wilfried Knott, et al.

U.S. Appl. No. 13/144,767, filed Jul. 15, 2011, US2011-0306694 A1, Martin Glos, et al.

U.S. Appl. No. 14/282,608, filed May 20, 2014, US2014-0256844 A1, Frauke Henning, et al.

U.S. Appl. No. 13/358,142, filed Jan. 25, 2012, US2012-0190760 A1, Frauke Henning, et al.

U.S. Appl. No. 13/883,207, filed May 2, 2013, US2013-0214211 A1, Kathrin Lehmann, et al.

U.S. Appl. No. 13/358,128, filed Jan. 25, 2012, US2012-0190762 A1, Roland Hubel, et al.

International Search Report dated Mar. 10, 2015 in PCT/EP2014/077307 filed on Dec. 11, 2014.

Combined Office Action and Search Report dated Mar. 30, 2017 in Chinese Patent Application No. 201480075933.5 with partial English translation, and English translation of Category of Cited Documents.

Combined Office Action and Search Report dated Apr. 13, 2017 in Russian Patent Application No. 2016129078/05 (045268) with English translation.

U.S. Appl. No. 15/106,557, filed Jan. 5, 2017, US 2017-0002181, Kathrin Lehmann et al.

* cited by examiner

SURFACE TREATMENT OF PARTICLES AND THEIR USE

FIELD OF THE INVENTION

The invention relates to polymer compositions comprising inorganic or organic particles which either have been surface-treated before the production of the compositions or are dispersed by special polyether-modified siloxanes through the production of the compositions.

STATE OF THE ART

Plastics which are formulated into corresponding polymer compositions are subdivided into the main groups of the thermoplasts and duroplasts.

Here, those polymers which have a flow transition temperature above the temperature of use are referred to as thermoplasts. Thermoplasts are linear or branched polymers which in principle become flowable above the glass transition temperature (Tg) in the case of amorphous thermoplasts and above the melting temperature (Tm) in the case of (partially) crystalline thermoplasts. In the softened state, they can be processed into moulded articles by pressing, extrusion, injection moulding or other shaping processes. The chain mobility here becomes so great that the polymer molecules easily slide past one another and the material reaches the melt-fluid state (flow region, polymer melt). The thermoplasts also include thermoplastically workable plastics with pronounced entropy elastic properties, the so-called thermoplastic elastomers. The thermoplastics include all plastics consisting of linear or thermolabilely crosslinked polymer molecules, for example polyolefins, vinyl polymers, polyesters, polyacetals, polyacetates, polycarbonates, and also some polyurethanes and ionomers but also TPEs— thermoplastic elastomers (RÖMPP ONLINE, Vers. 3.7, Carlowitz &. Wierer, Plastics (Datasheets), Chapter 1 Thermoplastics, Berlin: Springer Verlag (1987), Domininghaus, p. 95 ff).

Duroplasts are plastics which are formed by irreversible and tight crosslinking via covalent bonds from oligomers (technically: prepolymers), and less commonly from monomers or polymers. The word "duroplast" here is used both for the raw materials before the crosslinking (see reactive resins and also as a collective term for the cured, mostly fully amorphous resins. Duroplast are steel elastic at low temperatures and even at higher temperatures they cannot flow viscously but instead behave elastically with very limited deformability. The duroplasts include inter alia the industrially important substance groups of the diallyl phthalate resins (DAP0, epoxy resins (EP), urea-formaldehyde resins (UF), melamine-formaldehyde resins (MF), melamine-phenol-formaldehyde resins (MPF), phenol-formaldehyde resins and unsaturated polyester resins (UPES) (RÖMPP ONLINE, Vers. 3.7, Becker, G. W.; Braun, D.; Woebcken, W., Plastics Manual, Volume 10: Duroplasts, 2nd Edn.; Hanser: München, (1988); Elias (6.) 1, 7 and 476 ff.).

Gilbert (Gilbert, Varshney, van Soom and Schiller, "Plate-out in PVC Extrusion—I. Analysis of plate-out", Journal of Vinyl and Additive Technology, (14) 1, 2008, 3-9) describes the use of Ca stearate or other soaps or the corresponding carboxylic acids such as stearic acid in order to effect a surface treatment of titanium dioxide or barium sulphate or mixtures thereof. According to this procedure, undesired side-effects can arise, since such products are either not easy to use in large-scale industrial processes in pigment manufacture or also lead to so-called plate-out in the production of highly filled masterbatches, i.e. pigment concentrates of the pigments in a thermoplastic matrix. This is understood to mean burning of the thermoplastic pigment mixture onto the screw or the interior of the housing of the extrusion line. This necessitates expensive cleaning, particularly during colour changes. In addition, such burnt-on layers can at any time detach and result in speck formation in the masterbatch and later also in the end application, i.e. for example to specks in thin-layer films.

Furthermore, from GB 1 288 581 the use of silicone oils of different chain length/viscosity is known, which are either sprayed on during the milling of the pigment or can be introduced as emulsion into a pigment slurry. Pigments with silicone oil surface treatment admittedly display good hydrophobicity and because of their low surface energy are generally known for the fact that they can easily be incorporated into a low energy plastic environment. Pigments thus treated have various disadvantages:

1. Silicone oil-treated particles have a strong tendency to dusting, which can be a major problem in further processing and can sometimes even be a safety concern.
2. Low bulk density of the silicone oil-treated pigments leads to problems in the packing of the pigment into sacks, big bags or silos. A high air content necessitates filling with a lower mass per packaging unit. As the sacks cannot be stacked flat on a pallet, the strapping cost or the cost in case of film-wrapping of the pallets increase. Automatic packing with air conveying, which is regarded as standard with high output, in particular exhibits this problem.

However, silicone oils as surface treatment can lead to further problems in the production of consumer goods, e.g. to poor coating properties, printability and/or weldability of films, and in particular in multilayer films this can extend to delamination of layers and to loss of function (Plastics Additives: Advanced Industrial Analysis, 2006, Jan C. J. Bart, page 419-420; IOC Press, Netherlands, ISBN 1-58603-533-9; Brochure Trouble Shooting Guide-Siegwerk, March 2013).

From DE 41 40 793, EP 0 546 407 and EP 0 546 406 it is known that silicone oils or silane-based structures such as methacryloxypropyltrimethoxysilane are suitable for coating even oxide surfaces, in order through hydrophobization or functionalization of the surface and reduction of the viscosity to enable higher compatibility with the surrounding organic medium and thus higher efficiency of the pigments used. Silanes are sensitive to hydrolysis and generally require an elevated temperature of about 80° C. to activate the silyl functionality on the pigment or filler surface and form a polymeric structure on the surface. Many processes in pigment production are aqueous slurry processes or the pigments such as titanium dioxide are formed by precipitation reactions in water, so that there is a need to be able to introduce surface treatment agents into the process in aqueous form, e.g. emulsified in a simple form. On the other hand, in processes in which there is surface treatment of dry pigments or indeed fillers, there is the need that in these processes there is not automatically a possibility or additional costs incurred there in order to increase the temperature significantly over the ambient temperature, which is a process disadvantage for the attachment of silanes, since for this temperatures over 80° C. are necessary for the elimination of the alcohol. Hence there was the need to have a surface treatment for dry milling or mixing processes which optionally also guarantees surface modification without increasing the temperature.

This applies particularly for fillers or also selected flame retardants such as for example ATH, since these are often only broken up during mining, crushed and then graded, but in general have no wet chemical or physical purification process, so that no drying is necessary and hence the heating in order to fix a surface treatment is an additional process step, for which other aggregates are also necessary in order to produce tonnages of several thousand tonnes.

The dispersion of hydrophilic inorganic pigments such as for example iron oxide or very polar organic pigments is a problem particularly in nonpolar polymers such as for example polyolefins.

Either major cost due to long dispersion times has to be accepted or inadequate dispersion results, with unacceptable defects in the end product. Such defects can be: Speck formation in plastic films which are not only unsightly but can also lead to hole formation and hence leakages in the packaging, and specks in the injection moulded plastic part can thus result in markedly lower tensile strength or impact resistance and hence to a high reject rate in injection moulding production or even to failure of plastic parts important for safety in the automobile or electronic sector.

The purpose of the invention is therefore to overcome at least one disadvantage of the state of the art.

Surprisingly it has been found that special polyether-modified siloxanes as described in the claims solve the problem.

A subject of the present invention are therefore polymer compositions comprising
 a) solid particles,
 b) at least one polymer selected from thermoplasts or duromers,
 c) at least one compound of the formula (I),

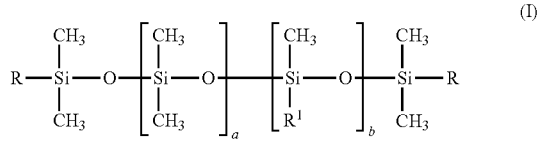

where
R identically or differently is $R^1$, methyl or hydroxy, preferably methyl,
$R^1$ identically or differently is a polyether residue of the formula (III)

where
Z is equal to a branched or unbranched alkylene residue with 2 to 4 carbon atoms, preferably 3 carbon atoms
m 2 to 4, preferably 3
n 1 to 3, preferably 1 or 2, particularly preferably 1
o 0 or 1, preferably 0
AO identically or differently is an oxyalkylene residue comprising oxyethylene, oxypropylene and/or oxybutylene residues,
$R^3$ identically or differently is hydrogen, an alkyl residue with 1 to 4 carbon atoms, and with the proviso that in $R^1$ the sum of carbon and oxygen atoms is at least 70,
a is 20 to 200, preferably from 30, from 40, from 50 or from 60 to 170, to 160, to 150, to 140, to 130, to 120 or to 110 and particularly preferably 70 to 100,
b 1 to 50, preferably from 2, from 3, from 4 to 30, to 25 or to 20 and particularly preferably 5 to 15,
with the proviso that if none of the residues R is equal to $R^1$, b is at least 3, and
 d) optionally further components Preferably the oxyalkylene residue AO has up to 50 wt. % oxyethylene groups, more preferably up to 40 wt. %, particularly preferably up to 35, 30, 25, 20, 15 or 10 wt. %, and especially preferably up to 5 wt. %. Preferably the oxyalkylene residue AO comprises 0 wt. %, more preferably at least 5, 10, 15, 20, 25 or 30 wt. % and in particular at least 35 wt. % oxyethylene groups. The oxyethylene content here is based on the total mass of the residue $R^1$.

Preferably, the oxyalkylene residue AO has from 0 to 50 wt. %, preferably from 5 to 35 wt. %, more preferably from 15 to 30 wt. % oxyethylene groups based on the total mass of the residue $R^1$.

If oxybutylene groups are present, the molar proportion of oxybutylene groups based on the sum of oxypropylene and oxybutylene groups is preferably at most 50%, preferably up to 45, 40, 35, 30, 25, 20, 15 or 10 and in particular up to 5%.

Preferably, the numerical content of unmodified siloxane fragments with the index a is up to 20 times as great as the content of siloxane fragments modified with polyether with the index b, preferably up to 20 times, up to 19, up to 18, up to 17, up to 16, up to 15, up to 14, up to 13, up to 12, up to 11, up to 10 or up to 9 and particularly preferably up to 8 times. Preferably the index a is at least 7 times the index b, more preferably at least 8 times, 9 times, 10 times or 11 times and in particular at least 12 times the index b.

Preferably the numerical ratio of index a to index b is equal to 8 to 18, preferably 9 to 15 and particularly preferably 10 to 12.

Preferably the index o is equal to zero.

Preferably the fragment with the index o is an unbranched residue, more preferably an unbranched residue with 3 carbon atoms. Particularly preferably, the fragment with the index o is a glyceryl residue, particularly preferably an n-glyceryl residue which bears the group —O—Z terminally.

Preferably the residue Z is a propylene residue.

Preferably the residue $R^3$ is a hydrogen.

Preferably the particles according to the invention are obtained by surface treatment with compounds of the formula (I), in that
$R^1$ identically or differently is a —(CH$_2$)$_p$—O-EO$_x$—PO$_y$—BO$_z$—$R^3$.
with the proviso that in $R^1$ the sum of carbon and oxygen atoms is at least 70, and
EO is oxyethylene,
PO oxypropylene,
BO oxybutylene
x 0 to 20, preferably 3 to 15, particularly preferably 4 to 10,
y 5 to 100, preferably 8 to 50, particularly preferably 10 to 30,
z 0 to 20, and
p equal to 2 to 4, preferably 2 and/or 3,
Preferably the index x is less than or equal to 1.2 preferably less than 1.1, more preferably less than 1, less than 0.9, less than 0.8, less than 0.7, less than 0.6, less than 0.5, less than 0.4 or less than 0.3 and in particular less than 0.2.

Preferably the index x is between 0.05 and 1.2 times the sum of the indices (y+z), preferably between 0.07 and 0.8 times, in particular between 0.1 and 0.5 times.

Furthermore, it is preferable that the index z is less than or equal to the index y, preferably less than or equal to one half, one third, one fourth, one fifth, one sixth, one seventh, one eighth, one ninth and in particular less than or equal to one tenth of the index y.

Preferably an oxybutylene group is linear, i.e. —(CH$_2$)$_4$—O— and/or branched, i.e. —CH(CH$_2$CH$_3$)CH$_2$—O—.

Particularly preferable are particles which are surface-treated with a polyether-modified siloxane of the formula (I), wherein the residue R is equal to methyl and the residue R$^3$ is equal to hydrogen, and the indices are a 80 to 95,
b 5 to 8,
x 3 to 5,
y 10 to 25 and
z 0.

Polyether-modified siloxanes in the sense of the invention are compounds of the formula (I).

The fragments of the formulae (I), (II) and (III), and the fragments AO and R$^1$ can be statistically constituted.

Statistical distributions are constituted blockwise with any number of blocks and have any sequence or a randomized sequence, they can also be constituted alternating or else form a gradient over the chain, in particular they can also form all mixed forms in which optionally groups of different distributions can follow consecutively. Specific embodiments can lead to the statistical distributions experiencing limitations due to the embodiment. For all regions which are not affected by the limitation, the statistical distribution is not changed.

Preferably, the polymer compositions according to the invention comprise compounds of the formula (I) with a defined content of 0.05 to 10 wt. %, preferably of 0.1 to 5 wt. %, more preferably of 0.5 to 3 wt. %, in particular of 1 to 2.5 wt. % based on the total composition.

More preferable are polymer compositions the particles whereof are colouring pigment particles.

Also preferable are polymer compositions comprising particles with the exception of titanium dioxide, barium sulphate, zinc sulphide and lithopone, which have been treated with compounds of the formula (I) before mixing with component b).

More preferable are polymer compositions comprising compounds of the formula (I) with a content of 0.01 to 3 wt. %, preferably 0.05 to 2 wt. %, more preferably of 0.1 to 2 wt. % and particularly preferably of 0.15 to 1 wt. % based on the particle mass as part of the composition.

Still more preferable are polymer compositions characterized in that the compositions comprise particles selected from ATH and MDH.

Particularly preferable are polymer compositions in which before mixing with component b) the particles have been treated with compounds of the formula (I), wherein the compositions contain at most 0.5 wt. %, preferably at most 0.45 wt. %, more preferably at most 0.4 wt. % water based on the total compositions.

One advantage of the particles according to the invention and compositions according to the invention is that the pressure filter values are lowered compared to the state of the art. This increases the service lifetimes of the processing devices, in particular the extruders, and decreases their cleaning cycles.

Good dispersion is also advantageous in order to avoid fibre breaks and/or specking of the products.

Also advantageous is the high thermal stability of the particles according to the invention and the compositions according to the invention.

The compositions according to the invention are advantageous compared to the state of the art since a marked increase in the tensile strength, the elongation at break and/or the impact resistance for plastic moulded articles can be observed.

The compositions according to the invention are also advantageous since markedly reduced evolution of fumes and heat from flame retardant compounds is observed. On determination of the flame retardant class according to UL 94 VO, the fire retardant class V0 can be attained with lower degrees of filling. This means that with a lower content of pigments in the same matrix, the flame retardant compounds according to the invention exhibit higher flame retardancy.

The compositions according to the invention are also advantageous since the water absorption of the compositions is reduced. Hence the materials are more suitable for the insulation of electrically conducting materials Furthermore, the compositions according to the invention have the advantage that the particles used exhibit improved flowability.

The use of the surface-treated particles in the compositions according to the invention is also advantageous since the packing density of the surface-treated particles increases, since the bulk density increases after the surface treatment. Hence transport/storage costs decrease.

A further advantage of the compositions according to the invention is their versatility of use in different formulations. This manifests itself in the fact that the compositions can be formulated on the basis of thermoplasts, duroplasts and plasticizers. For the downstream processing industry, such as for example paste manufacturers, compounders and masterbatchers it is advantageous that the compositions according to the invention can be used without further adaptations. This results in a financial advantage and formulation flexibility.

Primary particles in the sense of the invention can be mixtures of pigments, in particular coloured pigments, which are then surface-treated according to the invention.

Preferably the compositions according to the invention exhibit an improvement in water absorption of 25% compared to the compositions which do not contain a compound of the formula (I). An improvement in the water absorption is a decrease.

The packing density can be obtained by introduction of a defined mass, e.g. 70 g into a vertical cylinder, e.g. a measuring cylinder e.g. with a volume of 100 ml. After the introduction, the volume is read off on the graded scale and the packing density is obtained according to the relationship familiar to the skilled person.

The flowability can be determined by determination of the MFI (melt flow index) according to DIN EN ISO 1133 e.g. with a Meltfixer from SWO Polymertechnik.

Preferably, the compositions according to the invention have an MFI which lies at least 10% above the MFI which was determined with the same composition which comprise the same particles in non-surface-treated form. Preferably, the comparison compositions have the same components in the same mass proportions as the tested compositions according to the invention, and the difference lies only in the lack of surface treatment of the particles of the comparison compositions.

The dispersibility of the surface-treated particles according to the invention can be determined and assessed on the basis of the pressure rise before a filter (with mesh size to be stated) which arises during extrusion of a polymer melt via a screen pack (pressure filter value). The testing can for example be performed on the basis of DIN EN 13900-5: 2005.

Preferably the compositions according to the invention (based on polypropylene with use of organic colour pigments) in the form of masterbatches have a pressure filter value (9 μm) of up to 3 bar*cm²/g, more preferably of up to 2.5 bar*cm²/g, still more preferably of up to 2.0 bar*cm²/g and in particular of up to 1.5 bar*cm²/g with use of a screen with a mesh width of 9 μm.

A further possibility for the assessment of the dispersibility consists in the determination and assessment of the number of agglomerates in a flat film. Agglomerate are discernible here as specks. The number of specks should be as low as possible.

A further possibility for the assessment of the dispersibility consists in the determination of the granularity of pigments e.g. in a pigment paste or filler paste under defined dispersing conditions. Here for example a Grindometer for example as per Hegman is suitable. The determination can for example be performed according to DIN EN 21524 (corresponding to ISO 1525).

A further subject of the invention is the use of the polymer compositions according to the invention for processing into plastic moulded articles, films and/or foams.

Preferable polymers of the compositions according to the invention are duroplasts or thermoplasts. As duromers, for example unsaturated polyester resins (UP), phenol resins, melamine resins, formaldehyde moulding compounds, vinyl ester resins, diallyl phthalate resins, silicone resins or urea resins are suitable. As thermoplastic materials, for example polyethylene, polypropylene, polyesters, polyamide, PET, polystyrene, copolymers and blends thereof, polycarbonate, PMMA, or polyvinyl chloride are suitable.

The compositions according to the invention which are at least one UL 94 fire class better compared to the compositions which do not contain a compound of the formula (I) are preferred.

Preferably, the thermoplast-containing compositions according to the invention are processed into masterbatches and/or compounds. The compounds preferably exhibit increased fire retardancy, particularly preferably at least a fire retardancy of AL94 fire class V2.

The compositions according to the invention in which at least 80% of the test pieces meet class V-0, preferably all test pieces, are preferred. It is more preferable that at most 20% of the test pieces meet class V-1 but all others exceed this class (V-0).

More preferred are the compositions according to the invention for which with a filler content of 61 wt. % with surface-treated particles all test pieces meet the OL 94 fire class V-0, and it is more preferable that with a filler content of 59 wt. % at most 20% of the test pieces meet class V-1 but all others meet class V-0, and particularly preferable that all test pieces of the compositions according to the invention meet class V-0.

Furthermore, the duromer-containing compositions according to the invention are preferably processed into plastic moulded articles. The plastic moulded articles can preferably consist of foamed materials.

Furthermore, the tensile strength of the plastic moulded articles according to the invention is preferably improved, i.e. correspondingly increased, by at least 10% compared to the state of the art (containing silicone oil-treated particles). Furthermore, the impact resistance is preferably improved, i.e. correspondingly increased, by at least 10%, preferably at least 15%, particularly preferably at least 20% compared to the state of the art (containing silicone oil-treated particles).

Particularly preferably, the plastic moulded articles according to the invention based on polyesters exhibit an improvement in both the tensile strength and also the impact resistance of at least 10%, compared to comparable plastic moulded articles which contain no compounds of the formula (I).

Preferably, processing processes for the compositions according to the invention can be performed in the temperature range from 5 to 300° C., particularly preferably from 25 to 250° C. and especially preferably from 50 to 200° C. without adversely influencing the properties.

In principle, compositions comprising the surface-treated particles can be produced according to the processes of the state of the art, however they are preferably produced by the process described below.

A further subject of the invention is a process for surface treatment of pigment particles, flame retardants or other particulate materials with the exception of titanium dioxide, barium sulphate, zinc sulphide and lithopone particles, in which the primary particles in the treatment are contacted with at least one compound of the formula (I)

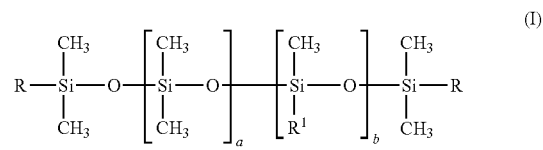

where
R identically or differently is $R^1$, methyl or hydroxy,
$R^1$ identically or differently is a polyether residue of the formula (III)

$$-Z-(O-C_mH_{2m-(n-1)})_o-[O-((AO)-R^3]_n \qquad (III)$$

where
Z is equal to a branched or unbranched alkylene residue with 2 to 4 carbon atoms, preferably 3 carbon atoms
m is 2 to 4, preferably 3
n 1 to 3, preferably 1 or 2, particularly preferably 1
o 0 or 1, preferably 0
AO identically or differently is an oxyalkylene residue comprising oxyethylene, oxypropylene and/or oxybutylene residues,
$R^3$ identically or differently is hydrogen or an alkyl residue with 1 to 4 carbon atoms,
and with the proviso that in $R^1$ the sum of carbon and oxygen atoms is at least 70,
a is 20 to 200, preferably from 30, from 40, from 50, or from 60 to 170, to 160, to 150, to 140, to 130, to 120 or to 110 and particularly preferably 70 to 100,
b 1 to 50, preferably from 2, from 3 or from 4 to 30, to 25 or to 20 and particularly preferably 5 to 15,
with the proviso that if none of the residues R is equal to $R^1$, b is at least 3,
wherein the compounds of the formula (I) are used with a content of 0.01 to 5 wt. %, preferably 0.3 to 5 wt. %, more preferably 1 to 4 wt. %, particularly preferably more than 2 to 4 wt. % based on the mass of the primary particles to be treated.

Preferably, the primary particles with the exception of $SiO_2$, $BaSO_4$, ZnS and/or lithopone primary particles are treated with 0.01 to 2 wt. %, preferably 0.05 to 1 wt. %, more preferably 0.1 to 0.8 wt. %, still more preferably 0.2 to 0.6 wt. % and particularly preferably 0.3 to 0.5 wt. % of the compounds of the formula (I) based on the mass of the primary particles to be treated.

The surface treatment of the primary particles can be effected dry or wet, and in the case of the wet embodiment this is preferably performed in emulsion. If the surface treatment is performed with an emulsified polyether-modified siloxane of the formula (I), then this can be effected with use of emulsifiers, but preferably no emulsifier is used.

In the preparation of the polyether-modified siloxanes of the formula (I) as emulsions, oil-in-water emulsions containing 5 to 70 wt. % polyether-modified siloxanes, 1 to 20 wt. % emulsifiers and 20 to 94 wt. % water are preferable. Methods for production of silicone emulsions are known to the skilled person. Usually their production is effected by stirring all components and optionally subsequently homogenizing with jet dispersers, rotor-stator or rotor-rotor homogenizers, colloid mills or high pressure homogenizers. Methods for emulsion production are described for example in EP0093310, DE2555048, EP1132417.

Here all emulsifiers which are known to the skilled person for the production of polysiloxane emulsions can be used, such as for example anionic, cationic, amphoteric or non-ionogenic emulsifiers.

Examples of anionic emulsifiers, but without restriction to these, are: Alkylsulphates, in particular with 8 to 22 carbon atoms in the alkyl group, alkyl and alkylaryl ether sulphates with 8 to 22 carbon atoms in the alkyl group and 1 to 40 oxyethylene or oxypropylene units. Sulphonates, in particular alkylsulphonates with 8 to 22 carbon atoms, alkylarylsulphonates with 8 to 22 carbon atoms, mono- and diesters of sulphosuccinates, salts of carboxylic acids with 8 to 22 carbon atoms in the alkyl, aryl, alkaryl or aralkyl unit. Phosphoric acid monoesters and diesters and salts thereof, in particular alkyl and alkaryl phosphates with 8 to 22 carbon atoms in the organic unit, alkyl ether and alkaryl ether phosphates with 8 to 22 carbon atoms in the alkyl or alkaryl unit and 1 to 40 oxyethylene units. As is well known in the emulsifiers field, the counter ions in the case of anionic emulsifiers can be alkali metal cations, ammonium or protonated substituted amines such as those of trimethylamine or triethanolamine. Normally, ammonium, sodium and potassium ions are preferable.

Examples of cationic emulsifiers, but without restriction to these, are: Salts of primary, secondary and tertiary fatty amines with 8 to 24 carbon atoms with acetic acid, sulphuric acid, hydrogen chloride and phosphoric acids. Quaternary alkyl and alkylphenylammonium salts, in particular those which possess 6 to 24 carbon atoms, especially halides, sulphates, phosphates and acetates thereof. Alkylpyridinium, alkylimidazolinium and alkyloxazolinium salts, in particular those with an alkyl chain of up to 18 carbon atoms, especially halides, sulphates, phosphates and acetates thereof.

Possible as amphoteric emulsifiers are: Amino acids with long-chain substituents such as for example N-alkyldi(aminoethyl)glycine or N-alkyl-2-aminopropionic acid salts. Betaines, such as for example N-(3-acylamidopropyl)-N,N-dimethylammonium salts with an acyl radical with 8 to 20 carbon atoms.

Examples of non-ionogenic emulsifiers, but without restriction to these, are: Polyoxyethylene condensation products of fatty acids or fatty alcohols with 8 to 22 carbon atoms with up to 95 wt. % oxyethylene content based on the molecular mass of the emulsifier; polyoxyethylene derivatives of phenols with 6 to 20 carbon atoms on the aromatic and up to 95 percent oxyethylene content; oxyethylene condensation products of fatty acid monoesters of glycerine with 10 to 22 carbon atoms and up to 95 percent oxyethylene; sorbitan esters of fatty acids with 10 to 22 carbon atoms; polyoxyethylene sorbitan esters of fatty acids with 10 to 22 carbon atoms; ethoxylated amides, ethoxylated amines, alkoxylated polysiloxanes, block copolymers of propylene, ethylene oxide and/or other epoxides.

The aforesaid fatty structures usually represent the lipophilic part of the emulsifiers. A usual fatty group is an alkyl group of natural or synthetic origin. Known unsaturated groups are the oleyl, linoleyl, decenyl, hexadecenyl and dodecenyl residues. Known saturated groups are lauryl, stearyl, myristyl and palmityl residues. Alkyl groups here can be cyclic, linear or branched In the emulsification, one emulsifier or a mixture of several different emulsifiers can be used, wherein preferably at least one non-ionogenic emulsifier, such as for example ethoxylated fatty acids, ethoxylated linear or branched fatty alcohols, sorbitan fatty acid esters or ethoxylated sorbitan fatty acid esters should be contained.

Furthermore, as thickeners, known compounds such as polyacrylic acid, polyacrylates, cellulose ethers such as carboxymethylcellulose and hydroxyethylcellulose, natural gums such as xanthan gum and polyurethanes and preservatives and other additives known to the skilled person can be added to the emulsions.

In the method according to the invention, the particles can be surface-treated in a single-stage or two-stage process. In the two-stage process, the primary particles are mixed with the polyether-modified siloxanes of the formula (I) in the first stage.

The first stage is preferably performed at room temperature or temperatures up to 60° C.

In the second stage, the particles from the first stage are milled. Preferable mills are steam jet mills, pin mills, air jet mills, roller mills or ball tube mills.

The milling can be effected at normal pressure or an increased pressure up to 20 bar, preferably up to 19 bar, 18 bar, 17 bar, 16 bar, 15 bar, 14 bar, 13 bar, 12 bar, 11 bar, 10 bar, 9 bar, 8 bar, 7 bar, 6 bar, 5 bar, 4 bar, 3 bar or up to 2 bar.

A further subject of the present invention is the use of the particles according to the process for the production of polymer compositions.

The polyether-modified siloxanes on which the invention is based can be produced by noble metal-catalysed hydrosilylation of the linear or branched hydrogen siloxanes of the formula (II)

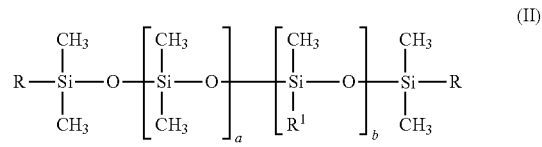

R identically or differently is $R^1$, methyl or hydroxy
$R^1$ equals hydrogen
with the aforesaid definitions of the residues and indices, with terminally unsaturated polyethers, as for example described in EP1520870.

The polyethers to be hydrosilylated satisfy the formula (IIIa)

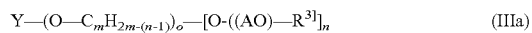

with the above definitions and preferences for the residues and indices, wherein the residue Y is terminally unsaturated, preferably with a C=C double bond, more preferably allylically unsaturated relative to the oxygen, in particular an allyl ether.

In a particular embodiment, for the preparation of the polyether, starting alcohols can be used which lead to branched polyethers which then have two or more oxyalkylene chains. Starting alcohols might be trimethylolpropane monoallyl ether or the glycerine monoallyl ethers. Preferable according to the invention are glycerine monoalkyl ethers, in particular the terminally allylically substituted glycerine monoallyl ether.

The hydrogen silanes used in the production of the polyether-modified siloxanes can be produced as described in the state of the art, for example in EP1439200. The unsaturated polyethers used can be produced starting from unsaturated starting alcohols by the known literature methods of alkaline alkoxylation or with use of DMC catalysts as in the state of the art, as for example DE102007057145.

The compositions according to the invention, the uses according to the invention comprising the compositions according to the invention and/or the particles according to the invention and furthermore the process according to the invention for the production of the particles are described below by way of example, without the invention being limited to these exemplifying embodiments. References below to ranges, general formulae or classes of compound should be taken to encompass not only the corresponding ranges or groups of compounds that are explicitly mentioned, but also all sub-ranges and sub-groups of compounds that may be obtained by extracting individual values (ranges) or compounds. Where documents are cited in the context of the present description, it is intended that their content fully form part of the disclosure content of the present invention. Where percentages are given below, they are percentages in % by weight unless stated otherwise. In the case of compositions, the percentages, unless stated otherwise, are based on the overall composition. Where average values are reported below, the averages in question are mass averages (weight averages), unless otherwise indicated. Where measurement values are reported below, these measurement values, unless stated otherwise, have been determined under a pressure of 101 325 Pa and at a temperature at 25° C.

EXAMPLES

General Methods and Materials:
Viscosity:

The viscosities were determined by means of a Brookfield LV-DV-I+ spindle viscosimeter. Brookfield viscosimeters are rotary viscosimeters having defined spindle sets as rotary bodies. The rotary bodies used were from an LV spindle set. Because of the temperature dependence of the viscosity, the temperatures of viscosimeter and measurement liquid were kept precisely constant to +/−0.5° C. Other materials used as well as the LV spindle set were a thermostatted water bath, a 0 to 100° C. thermometer and a time measurement device (gradations not greater than 0.1 seconds). To perform the measurement, 100 ml of the sample were introduced into a wide-necked bottle and measured under temperature-controlled conditions in the absence of air bubbles after prior calibration. To determine the viscosity, the viscosimeter was positioned relative to the sample such that the spindle dips into the product up to the mark. The measurement is triggered by means of the start button, with care being taken that the measurement was made in the favourable measurement range of 50% (+/−20%) of the maximum measurable torque, otherwise a suitable spindle had to be used. The result of the measurement was outputted on the display of the viscosimeter in mPas, and division by the density (g/ml) yields the viscosity (g/ml) in the unit [mm$^2$/s].

Particle Fineness Test:
a) With Grindometer

The determination is performed according to DIN EN 21524 (corresponding to ISO 1525).

3 g of the white pastes produced according to Example 5 (Z2) were stirred well with the spatula in a plastic beaker with the same quantity of DOP. To determine the fineness, the diluted paste was applied on the Hegman block (grindometer) firstly on the Hegman block 0 to 100 µm and then the samples of appropriate fineness were applied on the Hegman block 0 to 25 µm (Erichsen Co.). The visually determined fineness values in µm were noted.

b) With Pressure Filter Test

The determination of the pressure filter value was performed with the single-screw extruder Brabender Plasti-Corder LAB Station (screw diameter/length: 30 mm/25D). Different screen packs from GKD (PZ-Microdur 10 (Filter fineness 9 µm) and a supporting fabric of 315 µm mesh width were used. The extruder was heated to a temperature of 200° C. The temperature of the filter equipment was adjusted to 230° C. After thorough flushing of the extruder with LDPE, the filter holder with the screen pack was incorporated. After charging of the masterbatch pellets to be tested and emergence of the pigmented material at the bypass, the melt stream was passed through the screen pack and the computer-assisted measurement data capture started. The measurement data were recorded up to the attainment of a maximal pressure of 150 bar or else in case of a small pressure increase up to a duration of 60 minutes. The throughput was 40 g/min.

Flame Retardancy Testing:

To determine the fire resistance of plastic preparations, test pieces with a thickness of 4 mm were produced by injection moulding. The determination of the fire class was performed according to UL 94 (Underwriter Laboratories). The following fire classes are defined:

V-0: no afterburning longer than 10 secs, in 10 flame treatments the sum of the afterburn times is not greater than 50 secs, no burning drips, the sample does not burn completely, after end of flame exposure the sample glows for not longer than 30 secs.

V-1: after end of flame exposure the sample glows for not longer than 60 secs, in 10 flame treatments the sum of the afterburn times is not greater than 250 secs, other criteria as in V-0.

V-2: The wadding ignites because of burning drips, other criteria as V-1.

Not classifiable (ncl): does not meet fire class V-2.

Spectroscopic Analyses:

The recording and interpretation of NMR spectra is known to the skilled person. References include the book "NMR Spectra of Polymers and Polymer Additives", A. Brandolini and D. Hills, 2000, Marcel Dekker, Inc. The spectra were recorded at room temperature with a Bruker Spectrospin spectrometer, with measurement frequencies when recording the proton spectra of 399.9 MHz, when recording the $^{13}$C spectra of 100.6 MHz and when recording the $^{29}$Si spectra of 79.5 MHz.

Determination of Molecular Masses, in Particular the Weight Average Molecular Masses Mw:

The gel permeation chromatographic analyses (GPC) were performed with a type 1100 instrument from Hewlett-Packard using an SDV column combination (1000/10000 Å, each 65 cm, internal diameter 0.8 cm, temperature 30° C.), THF as mobile phase with a flow rate of 1 ml/min and an RI detector (Hewlett-Packard). The system was calibrated against a polystyrene standard in the range from 162 to 2,520,000 g/mol.

Determination of the SiH Content:

The determinations of the SiH values of the hydrogen siloxanes used but also that of the reaction matrices are each performed by gas volumetry through the sodium butylate-induced decomposition of aliquot weighed out sample amounts using a gas burette. Inserted into the general gas equation, the measured hydrogen volumes enable the determination of the content of active SiH functions in the educts but also in the reaction mixtures and thus enable conversion monitoring. A 5 wt. % sodium butylate solution was used.

In the following examples, TP 6875 means TEGOPREN® 6875, trademark of Evonik Industries AG, Essen.

Example 1: Synthesis

The polyethers used (table 1, PE) each have an allyl ether (PE1-PE8) or vinyl ether function (PE9) and a hydroxy group (PE1-PE9) at the chain ends and are characterized by different oxyethylene, oxypropylene and oxybutylene mass contents (EO/PO/BO mass contents, based on the polyether part without allyl/vinyl group) and molecular masses (Mw). The vinyl polyether PE9 has an oxybutylene residue as a fragment with the index o according to formula (III), in this case equal to —O—(CH$_2$)$_4$—. Glycerine monoallyl ether, which was used in the polyether PE10 and trimethylolpropane monoallyl ether, which was used in the polyether PE11.

TABLE #1

Composition of the polyethers used

| Polyether | PO, [wt. %] | EO, [wt. %] | BO, [wt. %] | Mw [g/mol] |
|---|---|---|---|---|
| PE1 | 77 | 23 | | 1057 |
| PE2 | 80 | 20 | | 518 |
| PE3 | 100 | 0 | | 414 |
| PE4 | 68 | 32 | | 1417 |
| PE5 | 88 | 12 | | 1336 |
| PE6 | 72 | 28 | | 1219 |
| PE7 | 90 | 10 | | 1180 |
| PE8 | 80 | 10 | 10 | 1194 |
| PE9 | 83 | 10 | 7 | 1194 |
| PE10 | 90 | 10 | | 1248 |
| PE11 | 90 | 10 | | 1298 |

The hydrogen siloxanes used (Table #2, SH) are characterized by different SiH contents and viscosities.

TABLE #2

Properties of the hydrogen siloxanes used

| Hydrogen siloxane | SiH content, [mmol/g] | Viscosity, 25° C., [mPa*s] |
|---|---|---|
| SH1 | 2.29 | 116 |
| SH2 | 0.90 | 159 |
| SH3 | 1.40 | 61 |
| SH4 | 3.52 | 101 |

The polyether-modified siloxanes (Table #3, O) were prepared by hydrosilylation by the following method.

The hydrogen siloxane SH used and the hydroxy functional terminally unsaturated PE used were placed in the ratio of 1.35 moles allyl polyether per mole equivalent SiH in a 500 ml four-necked flask with attached KPG stirrer, reflux condenser and internal thermometer, and heated with stirring at 70° C. 5 ppm of platinum in the form of the Pt$_2$(divinyltetramethyl-disiloxane)$_3$ complex (Karstedt catalyst, 1.5% Pt in deca-methylcyclopentasiloxane) were added to this with a syringe. The conversion determined by gas volumetry was quantitative within 1 to 3 hours postreaction time at 70-80° C. After filtration, yellow-brownish, clear, viscous liquids were obtained.

TABLE #3

Siloxanes prepared according to Example 1, the mixture cited in O13 is an equimolar mixture of the stated polyethers

| Example | Hydrogen siloxane | Polyether |
|---|---|---|
| O1 | SH2 | PE1 |
| O2 | SH2 | PE5 |
| O3 | SH1 | PE1 |
| O4 | SH2 | PE3 |
| O5 | SH2 | PE6 |
| O6 | SH3 | PE1 |
| O7 | SH4 | PE2 |
| O8 | SH1 | PE2 |
| O9 | SH4 | PE3 |
| O10 | SH4 | PE1 |
| O11 | SH2 | PE4 |
| O12 | SH2 | PE7 |
| O13 | SH4 | PE1 + PE5 |
| O14 | SH2 | PE8 |
| O15 | SH2 | PE9 |
| O16 | SH2 | PE10 |
| O17 | SH2 | PE11 |

Example 2: Emulsions 185 g of O12 were added within 20 minutes with cooling to an emulsifier solution made from 40 g of an ethoxylated stearic acid with an HLB value of ca. 18.8 and 60 g demineralized water with shearing (Mizer disc, 2000 rpm). The mixture was then sheared for a further 20 minutes. A paste of elevated viscosity was formed. Next, 214 g demineralized water were added within 10 minutes with shearing. A white emulsion with a solids content of ca. 45 wt. % was obtained. For preservation of the emulsion, 0.15% of an aqueous solution of 20 wt. % methylisothiazolinone (MIT) were added at the end.

Example 3: Surface Treatment of Particles

V1: Treatment of Inorganic Pigments in Dry Phase 495 g of the particles were placed in a Henschel mixer and then in each case 5 g of the surface treatment agents (according to Table #3: O1 to O17, and surface treatment agents of the state of the art) were added. For this, the mixer was run for 15 minutes at a speed of 900 rpm, during which heating to up to 70° C. can occur.

Iron oxide: Particles P-FO-1 to P-FO-17

Calcium carbonate: Particles P-KC-1 to P-KC-17

Talc, particles P-T-1 to P-T-17

ATH, particles P-ATH-1 to P-ATH-17

MDH, particles P-MDHT-1 to P-MDHT-17

In addition, comparison particles were prepared by means of surface treatment agents of the state of the art:

| Surface treatment agent | Calcium carbonate | Talc | ATH | MDH |
|---|---|---|---|---|
| None | P-KC-18 | P-T-18 | P-ATH-18 | P-MDHT-18 |
| TP 6875 | P-KC-19 | P-T-19 | P-ATH-19 | |
| Silicone oil 1000 | P-KC-20 | P-T-20 | P-ATH-20 | |

V2: Treatment of Inorganic Pigments in Wet Phase

The quantity of post-treatment agent is based on the solids content of the dispersion of the pigment, flame retardant or filler. In the wet treatment, the stated quantity ratios relate to the solids content of compounds of the formula (I) in the slurries.

Example 4: Preparation of Compounds Comprising Surface-Modified Particles which were Prepared According to or Analogously to Example 3

The following filler compound formulae were prepared with a Leistritz extruder 27 mm (twin-screw extruder from Leistritz) at 200 rpm:

| Ingredients | Mass [g] |
|---|---|
| Polypropylene, MFI 21 | 76.84 |
| surface-treated particles | 20 |
| Irganox PS 802 | 0.6 |
| Irganox 1010 | 0.2 |
| Uvinul 4050 | 0.13 |
| Uvinul 5050 | 0.13 |
| Calcium stearate | 0.1 |
| Carbon black masterbatch | 2 |

The compositions according to the invention Z-T-1 to Z-T-17 are obtained.

The compositions according to the invention Z-FO-1 to Z-FO-17 (iron oxide) and the compositions not according to the invention Z-FO-18 (without surface treatment) to Z-FO-20 (containing the comparison particles P-FO-19 to P-FO-20) are obtained.

In a similar manner, fire retardant compounds containing surface-treated ATH particles are prepared with the formula:

| Ingredients | Mass [g] |
|---|---|
| Escorene UL 0328 | 25.73 |
| Exxon LL 1004 YP | 12.67 |
| surface-treated particles | 61.4 |
| Irganox 1010 | 0.2 |

The compositions according to the invention Z-ATH-1 to Z-ATH-17 (ATH) and the compositions not according to the invention Z-ATH-18 to Z-ATH-20 (containing the comparison particles P-ATH-18 to P-ATH-20) are obtained.

In a similar manner, flame retardant compounds containing surface-treated MDH particles are prepared with the formula:

| Ingredients | Mass [g] |
|---|---|
| Escorene UL 00328 | 23.05 |
| Exxon LLDPE 1004 YP | 11.35 |
| surface-treated particles | 61.4 |
| Fusabond MB226 | 4 |
| Irganox 1010 | 0.2 |

The compositions according to the invention Z-MDH-1 to 17 (MDH) and the compositions not according to the invention Z-MDH-23 to Z-MDH-28 (containing the comparison particles P-MDH-23 to P-MDH-28) are obtained Example 5: Testing of the Properties of the Particles According to Example 3

(Determination of the Bulk Density):

To determine the bulk density, sample quantities of 15 g or 30 g were placed at room temperature in a 100 ml measuring cylinder. After 10 mins, the volumes were read off. The bulk density is calculated as the quotient of the sample weight and the volume found.

In the following table, the "*" stands for talc, ATH and MDH; i.e. the first three particles are P-T-1, P-ATH-1 and P-MDH-1.

| Particle | Bulk density Talc (T) [g/ml] | Bulk density ATH [g/ml] | Bulk density MDH [g/ml] |
|---|---|---|---|
| P-*-1 | 0.218 | 0.442 | 0.45 |
| P-*-2 | 0.217 | 0.431 | 0.47 |
| P-*-3 | 0.219 | 0.432 | 0.46 |
| P-*-4 | 0.220 | 0.436 | 0.42 |
| P-*-5 | 0.216 | 0.432 | 0.44 |
| P-*-6 | 0.220 | 0.439 | 0.43 |
| P-*-7 | 0.219 | 0.440 | 0.45 |
| P-*-8 | 0.218 | 0.439 | 0.44 |
| P-*-9 | 0.217 | 0.438 | 0.43 |
| P-*-10 | 0.220 | 0.441 | 0.42 |
| P-*-11 | 0.220 | 0.440 | 0.45 |
| P-*-12 | 0.219 | 0.442 | 0.46 |
| P-*-13 | 0.218 | 0.438 | 0.43 |
| p-*-14 | 0.217 | 0.439 | 0.45 |
| P-*-15 | 0.219 | 0.441 | 0.44 |
| P-*-16 | 0.218 | 0.438 | 0.44 |
| P-*-17 | 0.220 | 0.435 | 0.45 |
| P-*-18 (none) | 0.214 | 0.429 | 0.41 |
| P-*-19 (TP 6875) | 0.214 | 0.427 | 0.42 |
| P-*-20 (silicone oil 1000) | 0.200 | 0.411 | 0.39 |

Example 6A: Tensile Strength, Elongation at Break and Impact Resistance

In order to be able to assess the mechanical properties of the filler compounds, shouldered rods were prepared by injection moulding (Engel Germany). Tensile test rods type 1A were prepared as described in DIN ISO 527-2.

The tensile strength was obtained by means of a tensile test device from Zwick (23° C., 50% rel. atmospheric humidity). The machine parameters: initial load=20 N, speed up to initial load=1 mm/min, test speed=5 mm/min, clamping length=120 mm and measurement length of the incremental pick-up=80 mm, thickness of the test piece 4 mm corresponding to the tensile test rod type 1A were used.

Impact Resistance (Charpy):

The tests were performed with a 5 J impact pendulum according to ISO 179.

Results of the mechanical tests: Z-T-18 and Z-ATH-18 are test pieces whose particles were not post-treated.

| Test sample | Tensile strength $\sigma_M$ [MPa] | Elongation at break ɛtB [%] | Impact resistance [kJ/m²] |
|---|---|---|---|
| Z-T-1 | 26.3 | 25 | 6.05 |
| Z-T-2 | 26.5 | 28 | 6.32 |
| Z-T-3 | 26.6 | 29 | 5.94 |
| Z-T-4 | 26.4 | 26 | 5.99 |
| Z-T-5 | 26.5 | 18 | 6.05 |
| Z-T-6 | 26.7 | 19 | 6.09 |
| Z-T-7 | 27.0 | 23 | 6.32 |
| Z-T-8 | 26.8 | 22 | 6.51 |
| Z-T-9 | 26.9 | 24 | 6.09 |
| Z-T-10 | 26.8 | 18 | 6.26 |
| Z-T-11 | 26.9 | 19 | 6.39 |
| Z-T-12 | 27.2 | 22 | 6.58 |
| Z-T-13 | 27.2 | 26 | 5.99 |
| Z-T-14 | 27.0 | 23 | 5.95 |
| Z-T-15 | 26.6 | 25 | 5.99 |
| Z-T-16 | 26.4 | 21 | 6.28 |
| Z-T-17 | 26.9 | 20 | 6.42 |
| Z-T-18 | 26.2 | 15 | 5.81 |

| Example ATH | Tensile strength $\sigma_M$ [MPa] | Elongation at break ɛtB [%] |
|---|---|---|
| Z-ATH-1 | 11.8 | 67 |
| Z-ATH-2 | 10.9 | 73 |
| Z-ATH-3 | 10.4 | 85 |
| Z-ATH-4 | 10.9 | 110 |
| Z-ATH-5 | 10.8 | 91 |
| Z-ATH-6 | 11.2 | 78 |
| Z-ATH-7 | 10.7 | 90 |
| Z-ATH-8 | 11.3 | 72 |
| Z-ATH-9 | 11.1 | 71 |
| Z-ATH-10 | 11.7 | 84 |
| Z-ATH-11 | 11.0 | 85 |
| Z-ATH-12 | 11.9 | 103 |
| Z-ATH-13 | 11.5 | 108 |
| Z-ATH-14 | 10.7 | 101 |
| Z-ATH-15 | 10.9 | 81 |
| Z-ATH-16 | 10.6 | 76 |
| Z-ATH-17 | 11.5 | 71 |
| Z-ATH-18 | 10.2 | 58 |

Compositions Containing Surface-Treated MDH Particles

In order to be able to assess the mechanical properties of the filler compounds, using a single-screw extruder Brabender Plasti-Corder LAB Station (screw diameter/length: 30 mm/25D) compound strips of 1.7 mm thickness were continuously produced from the compounds previously prepared according to the above description by means of twin-screw extruders and shouldered rods were stamped out of these compound strips with a tool, which according to DIN ISO 527-2 yield type 5A rods.

The tensile strength was obtained with a tensile test device from Zwick (23° C., 50% rel. atmospheric humidity). The machine parameters were: initial load=20 N, speed up to initial load=1 mm/min, test speed=5 mm/min, clamping length=120 mm and measurement length of the incremental pick-up=80 mm.

The fire classes were tested in a combustion chamber according to UL 94. Z-MDHT-18: The MDH were not surface-treated.

| Example MDH | Tensile strength $\sigma_M$ [MPa] | Elongation at break ɛtB [%] |
|---|---|---|
| Z-MDHT-1 | 12.1 | 220 |
| Z-MDHT-2 | 12.0 | 200 |
| Z-MDHT-3 | 12.3 | 180 |
| Z-MDHT-4 | 12.5 | 190 |
| Z-MDHT-5 | 11.9 | 220 |
| Z-MDHT-6 | 12.0 | 210 |
| Z-MDHT-7 | 12.1 | 200 |
| Z-MDHT-8 | 12.4 | 200 |
| Z-MDHT-9 | 12.3 | 200 |
| Z-MDHT-10 | 12.0 | 220 |
| Z-MDHT-11 | 11.7 | 220 |
| Z-MDHT-12 | 12.2 | 210 |
| Z-MDHT-13 | 12.0 | 210 |
| Z-MDHT-14 | 11.9 | 180 |
| Z-MDHT-15 | 11.9 | 190 |
| Z-MDHT-16 | 12.2 | 210 |
| Z-MDHT-17 | 12.3 | 220 |
| Z-MDHT-18 | 10.8 | 160 |

Example 6B: Fire Class 5 specimens (test pieces) were always tested, and these are also the type 1A rods produced for the mechanical testing.

Specimens containing 59 and 61.4% were tested analogously, as to the manner described in UL 94. The fire classes were tested in a combustion chamber according to UL 94, and the fire class is stated with the number of test pieces which pass V2, V1 or V0, or if necessary as failed if none of the classes is attained.

Z-ATH-18 is based on a composition the ATH particles whereof were not surface-treated. Z-ATH-19 is based on compositions the particles whereof were treated with silicone oil according to the state of the art.

| Example ATH | Fire class 59% | 61.4% |
|---|---|---|
| Z-ATH-1 | 5x V0 | 5xV0 |
| Z-ATH-2 | 4xV0, 1xV1 | 5xV0 |
| Z-ATH-3 | 5x V0 | 5xV0 |
| Z-ATH-4 | 4xV0, 1xV1 | 5xV0 |
| Z-ATH-5 | 4xV0, 1xV1 | 5xV0 |
| Z-ATH-6 | 5x V0 | 5xV0 |
| Z-ATH-7 | 5x V0 | 5xV0 |
| Z-ATH-8 | 4xV0, 1xV1 | 5xV0 |
| Z-ATH-9 | 5x V0 | 5xV0 |
| Z-ATH-10 | 5x V0 | 5xV0 |
| Z-ATH-11 | 5x V0 | 5xV0 |
| Z-ATH-12 | 5x V0 | 5xV0 |
| Z-ATH-13 | 4xV0, 1xV1 | 5xV0 |
| Z-ATH-14 | 4xV0, 1xV1 | 5xV0 |
| Z-ATH-15 | 5x V0 | 5xV0 |
| Z-ATH-16 | 5x V0 | 5xV0 |
| Z-ATH-17 | 4xV0, 1xV1 | 5xV0 |
| Z-ATH-18 | failed | 2xV0, 3xV1 |
| Z-ATH-19 | failed | 2xV2, 3xV1 |

From the results it can be seen that fire class V-0 is attained, although a lower content of fire retardant (ATH) is contained in the compound.

Example 6C: MFI (Melt Flow Index) and Water Absorption of the Dry Post-Treated MDH Particles (Flame Retardant Compound)

Here, to determine the water absorption the tensile test rods described which correspond to type 1A, i.e. not the extruded strips resulting in the stamped out type 5A, were used. The test pieces are stored in the oven for 14 days at 80° C. and the weight increase then stated in %.

The testing of the MFI was performed by means of DIN EN ISO 1133 with the instrument Meltfixer from SWO Polymertechnik GmbH.

Z-MDHT-18 is based on a composition the particles whereof were not surface-treated.

| Example MDH | MFI at 190° C./21.6 kg | Water absorption in % |
|---|---|---|
| Z-MDHT-1 | 7.58 | 0.34 |
| Z-MDHT-2 | 8.31 | 0.38 |
| Z-MDHT-3 | 8.02 | 0.33 |
| Z-MDHT-4 | 7.79 | 0.38 |
| Z-MDHT-5 | 7.91 | 0.40 |
| Z-MDHT-6 | 8.31 | 0.29 |
| Z-MDHT-7 | 8.09 | 0.31 |
| Z-MDHT-8 | 7.88 | 0.36 |
| Z-MDHT-9 | 7.81 | 0.29 |
| Z-MDHT-10 | 8.54 | 0.28 |
| Z-MDHT-11 | 9.01 | 0.29 |
| Z-MDHT-12 | 8.87 | 0.26 |
| Z-MDHT-13 | 7.69 | 0.26 |
| Z-MDHT-14 | 7.42 | 0.28 |
| Z-MDHT-15 | 7.92 | 0.27 |
| Z-MDHT-16 | 8.03 | 0.34 |
| Z-MDHT-17 | 7.56 | 0.39 |
| Z-MDHT-18 | 6.72 | 0.55 |

From the values it can be seen that through the surface treatment of the particles the water absorption of the compositions according to the invention fell to below 0.45%.

Relative to the compositions based on untreated particles, the flowability increased by at least 5%.

V4 Liquid Pastes Method:

V4A: Production of Pigment Pastes with Surface-Modified Pigments

For the liquid pastes production, pigments were used which had previously been coated with the compounds of the formula (I) by modification in the dry phase. 98 g of pigment are post-treated with 2 g of polyether-modified siloxanes and the aforesaid Henschel equipment is used for this. Next, 80 g of an epoxidized soya oil (e.g. Epoxol D 44, FACI) with 20 g of pigment Blue 15:3 which had been coated with the compounds according to the invention (e.g. Heliogen Blue K 7090, BASF) are weighed out into a 250 ml powder jar and dispersed for 5 mins at 2500 rpm with an H-Trieb with dissolver disc.

Testing of the Liquid Pastes 3 g of the pigment pastes prepared are applied for the determination of the fineness on the Hegman block (grindometer) 0-25 µm (Erichsen). The visually determined fineness values in µm were noted.

A fineness of greater than 15 µm indicates inadequate dispersion.

Determination of the granularity: Z-P-18 is a paste the particles whereof had not been surface-treated, Z-P-19 is a paste the particles whereof had been surface-treated with silicone oil according to the state of the art.

| Example (Heliogen Blue) | Fineness [µm] |
|---|---|
| Z-P-1 | 13 |
| Z-P-2 | 12 |
| Z-P-3 | 12 |
| Z-P-4 | 12 |
| Z-P-5 | 13 |
| Z-P-6 | 13 |
| Z-P-7 | 12 |
| Z-P-8 | 12 |
| Z-P-9 | 12 |
| Z-P-10 | 12 |
| Z-P-11 | 12 |
| Z-P-12 | 12 |
| Z-P-13 | 13 |
| Z-P-14 | 13 |
| Z-P-15 | 12 |
| Z-P-16 | 13 |
| Z-P-17 | 12 |
| Z-P-18 | 18 |
| Z-P-19 | 25 |

Compositions Prepared by Mixing Polymers with Particles and Surface Treatment Agents in One Process Step V5B: Production of Pigment Pastes where the Unmodified Particle is Dispersed into a Mixture of Continuous Phase and Special Alkoxylated Polyethers.

For the production of pigment pastes as alternatives to solid pigment masterbatches, pigment pastes are produced according to the following formulae: The use of additives of the formula (I) leads to compositions according to the invention.

The components are placed together with 200 g of glass beads (diameter 2 mm) in a 250 ml powder bottle and dispersed for 2 hrs in the Scandex (Lau GmbH):

| Ingredients | Paste 1 | Paste 2 | Paste 3 | Paste 4 |
|---|---|---|---|---|
| Rape oil | 78 | 78 | | |
| Diisononyl phthalate | | | 78 | 78 |
| Phthalocyanine blue (Heliogen Blue K 7090, BASF) | 20 | | 20 | |
| Pigment Red 57:1 (Irgalite ® Rubine K 4270 FP, BASF) | | 20 | | 20 |
| Additive (Compound of the formula (I)) | 2 | 2 | 2 | 2 |

Thermoplastic Injection Moulded Parts Based on Polypropylene

In order to determine the colouring power and dispersion quality of the pastes listed in Table #20, plates of 6×6×0.2 cm size are produced by injection moulding (Engel Germany). For this, 400 g of polypropylene (MFI 20) are mixed with 16 g of white masterbatch ($TiO_2$ content=50%) and 4 g of pigment paste in the PE bag and the injection moulded part assessed by colorimetry.

Colorimetric Assessment and Calculation of the Colour Intensity:

The colorimetric values of the plates produced are determined by means of a spectrophotometer (SP 68, X-Rite). The results are stated in Table #20 as L-a-b values. At the same time, the colour strength compared to a reference sample is calculated. The better the pigment was dispersed in the phase, the higher is the colour strength compared to the reference sample. The reference sample is by definition set at 100%.

TABLE #20

The values stated were determined using paste 1, ZZ-P-18 is based on a composition which contained no compound of the formula (I).

| Example | L* | a* | b* | Colour strength [%] |
|---|---|---|---|---|
| ZZ-P-1 | 61.76 | | -37.26 | 108 |
| ZZ-P-2 | 61.33 | | -37.21 | 109 |
| ZZ-P-3 | 61.19 | -20.92 | -37.37 | 109 |
| ZZ-P-4 | 60.78 | | -37.10 | 112 |
| ZZ-P-5 | 61.35 | | -37.09 | 109 |
| ZZ-P-6 | 60.60 | | -37.13 | 113 |
| ZZ-P-7 | 60.50 | | -36.92 | 116 |
| ZZ-P-Z8 | 60.34 | -20.69 | -37.13 | 116 |
| ZZ-P-9 | 60.58 | | -36.89 | 115 |
| ZZ-P-10 | 61.75 | | -37.02 | 108 |
| ZZ-P-11 | 61.55 | | -37.18 | 109 |
| ZZ-P-12 | 60.37 | -20.62 | -36.78 | 116 |
| ZZ-P-13 | 60.41 | | -36.95 | 116 |
| ZZ-P-14 | 60.78 | | -37.01 | 112 |
| ZZ-P-15 | 60.87 | | -37.14 | 112 |
| ZZ-P-16 | 61.45 | | -37.42 | 108 |
| ZZ-P-17 | 61.40 | | -37.15 | 109 |
| ZZ-P-18 | 62.45 | -20.82 | -35.83 | 100 |

As can be clearly seen from the values, the colour strength is increased by at least 8% through the polyether-modified siloxanes according to the description and the better dispersion becomes clear not only from this, but also from the reduced brightness values L*, which are typical for a better dispersed blue pigment. Since the red value a* scarcely changes and is not very characteristic, it is not also stated here for all compositions and the blue value also is only listed for completeness.

V5C Production of Pigment Pastes for PU Foam Applications

The components are placed together with 200 g of glass beads (diameter 2 mm) in a 250 ml powder bottle and dispersed for 4 hrs in the Scandex (Lau GmbH).

The pigment pastes are produced according to the following formula:

| | Paste |
|---|---|
| Polyol (Caradol ED-03) | 70 g |
| Surface-treated carbon black (Monarch 800, Cabot) | |
| Carbon black (Monarch 800, Cabot) | 20 g |
| Additive (Compound of the formula (I)) | 10 g |

For the production of the PU foams, the following components are mixed and foamed in a plastic beaker. After the end of the reaction time, plates are sawn out of this foam and the colour strength calculated by means of a spectrophotometer (SP 68, X-Rite). As the reference sample, a foam with no additive which is defined with 100% colour strength is selected.

Production of a PU foam for assessment of the dispersion quality which is assessed on the basis of the colour strength development:

| Ingredients | Mass [g] |
|---|---|
| Polyether polyol OHZ: 47 (Varanol CP 3322; Dow) | 100.00 |
| Metal catalyst (Kosmos 29, Evonik) | 0.22 |
| Tegostab BF 2370, Evonik | 1.00 |
| Water | 5.00 |
| Dimethylethanolamine | 0.15 |
| Tolyl diisocyanate | 58.40 |
| Varonate T-80, Dow | |
| Pigment paste | 1.00 |

The composition Z-R-18 contained no compound of the formula (I), the composition Z-R-19 contained silicone oil.

| Example | Colour strength [%] |
|---|---|
| Z-R-1 | 108 |
| Z-R-2 | 107 |
| Z-R-3 | 108 |
| Z-R-4 | 111 |
| Z-R-5 | 110 |
| Z-R-6 | 115 |
| Z-R-7 | 110 |
| Z-R-Z8 | 109 |
| Z-R-9 | 108 |
| Z-R-10 | 109 |
| Z-R-11 | 109 |
| Z-R-12 | 112 |
| Z-R-13 | 109 |
| Z-R-Z14 | 112 |
| Z-R-15 | 113 |
| Z-R-16 | 110 |
| Z-R-17 | 109 |
| Z-R-18 | 100 |
| Z-R-19 | 78 |

The colour strength is increased by at least 7%, whereas the use of a hydrophobizing silicone oil in the carbon black paste even results in marked worsening of the colourability of a PU foam, which can already be seen from the high paste viscosity.

V6: Surface Modification of Flame Retardants in the Extrusion/Compounding of Unmodified Particles with the Special Alkoxylated Siloxanes Using a Leistritz extruder 27 mm (double screw extruder from Leistritz) the following flame retardant compound formula was produced at 200 rpm according to the following composition.

| Ingredients | Mass [g] |
|---|---|
| Escorene UL 00328 | 23.05 |
| Exxon LLDPE 1004 YP | 11.35 |
| Non surface-treated particles (MDH) | 61.4 |
| Fusabond MB226 | 4 |
| Irganox 1010 | 0.2 |
| Additive (Compound of the formula (I)) | 1.0 |

The composition Z-MDHB-18 is based on a composition of the above table without addition of the additive.

| Example MDH | MFI |
|---|---|
| Z-MDHB-1 | 7.96 |
| Z-MDHB-2 | 7.59 |
| Z-MDHB-3 | 7.59 |
| Z-MDHB-4 | 7.85 |
| Z-MDHB-5 | 7.58 |
| Z-MDHB-6 | 7.77 |

-continued

| Example MDH | MFI |
|---|---|
| Z-MDHB-7 | 7.95 |
| Z-MDHB-8 | 7.82 |
| Z-MDHB-9 | 7.58 |
| Z-MDHB-10 | 7.99 |
| Z-MDHB-11 | 7.91 |
| Z-MDHB-12 | 7.68 |
| Z-MDHB-13 | 7.54 |
| Z-MDHB-14 | 7.87 |
| Z-MDHB-15 | 8.01 |
| Z-MDHB-16 | 7.55 |
| Z-MDHB-17 | 7.68 |
| Z-MDHB-18 | 6.72 |

V7: Surface Treatment of Pigments in the Masterbatch Extrusion as a Method, e.g. for Pigments The mixtures are processed in a twin-screw extruder from Leistritz (Model: Micro 27 GL 40D) at 200 rpm The pigment preparations were produced by premixing the individual components in the premix according to the formulation shown below:

|  | Masterbatch 1 | Masterbatch 2 |
|---|---|---|
| Polypropylene Homopolymer MFI = 55 (230° C./2.16 kg) (PPH 11012, Total) | 56 g | 56 g |
| Pigment blue 57:1 (Heliogen Blue D 6902, BASF) | 40 g |  |
| Pigment red 202 (Cromophtal ® Magenta P, BASF) |  | 40 g |
| Additive (Compound of the formula (I)) | 4 g | 4 g |

Testing of the Dispersibility of Surface-Treated Particles
E2: Testing of the Masterbatches in the Pressure Filter Test The determination of the pressure filter value was performed with the single screw Brabender Plasti-Corder LAB Station (screw diameter/length: 30 mm/25D). A screen packet from GKD with a PZ-Microdur 10 (filter fineness 9 µm) and a supporting fabric with 315 µm mesh width was used. The extruder was heated to a temperature of 200° C. The temperature of the filter equipment was adjusted to 230° C. After thorough flushing of the extruder with LDPE, the filter holder with the screen pack was incorporated. After charging of the masterbatch pellets to be tested and emergence of the pigmented material at the bypass, the melt stream was passed through the screen pack and the computer-assisted measurement data capture started. The measurement data were recorded up to the attainment of a maximal pressure of 150 bar or else in case of a small pressure increase up to a duration of 60 minutes. The throughput was 40 g/min.

The measure of the dispersion quality is the pressure filter value (PFV), which is calculated according to the following formula:

$$DF = \frac{(p_{max} - p_0) \times F \times 100}{t \times K \times G} \quad [bar \times cm^2/g]$$

$p_{max}$: Final pressure [bar]
$p_0$: Initial pressure [bar]
F: Filter area=6.16 cm$^2$
t: Measurement time [mins]
K: Concentration [wt. %] of pigment based on total composition
G Throughput [g/min]

Pressure filter values of Masterbatch 1 (Heliogen Blue, D6911)

| Example | Pressure filter value |
|---|---|
| Z-HB-1 | 0.99 |
| Z-HB-2 | 1.29 |
| Z-HB-3 | 1.34 |
| Z-HB-4 | 0.89 |
| Z-HB-5 | 1.27 |
| Z-HB-6 | 1.56 |
| Z-HB-7 | 1.49 |
| Z-HB-8 | 1.22 |
| Z-HB-9 | 0.97 |
| Z-HB-10 | 0.89 |
| Z-HB-11 | 1.11 |
| Z-HB-12 | 1.01 |
| Z-HB-13 | 1.43 |
| Z-HB-14 | 1.29 |
| Z-HB-15 | 1.53 |
| Z-HB-16 | 1.33 |
| Z-HB-17 | 1.09 |
| Z-HB-18 | 3.4 |

The lower the pressure filter value, the better is the dispersion of the pigment in the polymer. Pressure filter values ≥2 bar*cm$^2$/g indicate inadequate dispersibility.

Testing of Dispersion Quality by Determination of the Colour Strength in the Injection Moulded Part In order to assess the dispersion quality of the masterbatches produced, 300 g of the aforesaid polypropylene are mixed with 8.6 g of a white masterbatch (70% TiO$_2$ content) and 3 g of the pigment masterbatch and plates of 6 cm×6 cm×0.2 cm size produced by injection moulding (Engel Germany) and then assessed by colorimetry according to the CIE Lab colour system. The higher the colour strength compared to a reference sample, the better is the distribution of the pigment, and the lower the agglomerate content in the original colour masterbatch. For the comparison, the colour strength of the reference samples is by definition taken to be 100%. The reference sample Z-HB2-18 was produced with no additive.

| Example | Colour strength [%] |
|---|---|
| Z-HB2-1 | 112 |
| Z-HB2-2 | 118 |
| Z-HB2-3 | 112 |
| Z-HB2-4 | 114 |
| Z-HB2-5 | 110 |
| Z-HB2-6 | 116 |
| Z-HB2-7 | 115 |
| Z-HB2-8 | 118 |
| Z-HB2-9 | 112 |
| Z-HB2-10 | 117 |
| Z-HB2-11 | 123 |
| Z-HB2-12 | 121 |
| Z-HB2-13 | 118 |
| Z-HB2-14 | 110 |
| Z-HB2-15 | 113 |
| Z-HB2-16 | 115 |
| Z-HB2-17 | 110 |
| Z-HB2-18 | 100 |

From the values in the above table, it can be seen that the colour strengths have increased by at least 10% due to the additives of the formula (I).

Testing of the Masterbatch in Polymer Flat Films:

The masterbatches in the above table were extruded into films by the following process. For this, the masterbatches were diluted with LDPE pellets (polymer PP 11012 powder) to a concentration of 10 wt. % pigment. For this, masterbatch and polymer pellets were placed in a plastic bag and shaken by hand for 0.5 mins. After this, from the mixtures, by means of a single screw extruder Brabender Plasti-Corder LAB Station (screw diameter/length: 30 mm/25D) films were produced with a film blowing machine. The film strand was drawn off via a conveyer belt, cooled and rolled up.

5 pieces about 50 cm long from the film strand were inspected (10 cm wide and 150 micrometers thick). The assessment of the number of undispersed agglomerates was made in transmitted light. In this, the size of the specks, which consist of incompletely dispersed agglomerates, had no influence on the rating.

The results were rated using a five point system, the ratings meaning as follows: 1. no or max. 1 speck per piece, 2. isolated specks (2-3 specks per piece), 3. moderate number (4-6 specks per piece), 4. many specks, and 5. very many specks (>10 specks). At the end, the 5 pieces assessed are combined to give a whole number or if necessary the score for example stated as 1.5, if the number of foil specks would permit a rating of 1 or 2.

| Example | Rating |
|---|---|
| Z-F-1 | 1.5 |
| Z-F-2 | 1.5 |
| Z-F-3 | 1.5 |
| Z-F-4 | 1.5 |
| Z-F-5 | 2 |
| Z-F-6 | 2 |
| Z-F-7 | 1.5 |
| Z-F-8 | 2 |
| Z-F-9 | 1.5 |
| Z-F-10 | 2 |
| Z-F-11 | 2 |
| Z-F-12 | 1.5 |
| Z-F-13 | 2 |
| Z-F-14 | 2 |
| Z-F-Z15 | 2 |
| Z-F-16 | 1.5 |
| Z-F-17 | 1.5 |
| Z-F-18 | 5 |

Testing in Unsaturated Polyester Resins Filled with Flame Retardant (UPES According to Römpp)

In accordance with the following formula, the components were mixed in the dissolver and dispersed for 10 mins at 3,000 rpm in a disperser vessel, where the dispermat disc has ⅔ of the diameter of the vessel

| Ingredients | Function | Formula 1 [g] |
|---|---|---|
| Distitron 416B1V12 (Polynt/Italy) | Polyester resin | 35.0 |
| Apyral 24 (Nabaltec AG, Germany) | Aluminium hydroxide | 65.0 |
| Butanox M 50 (Akzo Nobel) | Curing agent | 1.0 |
| Accelerator NL 49 P (Akzo Nobel) | Accelerator | 0.3 |
| Additive Compounds of the formula (I) | | 0.5 |

The resulting mixtures are cast in moulds in order to obtain shouldered rods in accordance with DIN ISO 527-2 type 5A rods.

The tensile strength test was performed with a tensile tester from Zwick (23° C., 50% rel. atmospheric humidity). The machine parameters were: initial load=20 N, speed up to initial load=1 mm/min, test speed=5 mm/min, clamping length=55 mm and measurement length of the incremental pick-up=25 mm.

In addition, 6 cm×6 cm plates, of 2 mm layer thickness are cast, and then used as test pieces for scratch resistance, and where the brightness value is determined before and after scratching in order to obtain the scratch resistance as a delta L value.

The scratch resistance testing is performed in accordance with GMW 14688 Section A. As the testing instrument, a Scratch Hardness Tester 430 P from Erichsen, Hemer is used. A 6×6 cm test plate is clamped into the instrument. Using a test point which has a 1.0 mm diameter ball, 40 mm long scratches with a spacing of 2 mm are scratched into the plate at a speed of 1000 mm/min. After 20 scratches, the plate is turned through 90° and 20 scratches are again made. The resulting grid is used for assessment of the scratch resistance.

For the metrological assessment of the scratch resistance, the plate is assessed by colorimetry with a spectrophotometer (SP 62, X-Rite) before clamping into the instrument. After the test, a second measurement is performed. In each case the brightness value (L*) is measured and the difference between the two L values used as the delta L value for the assessment.

The lower the resulting delta L value, the better is the scratch resistance.

The composition Z-UPES-18 is based on a composition which contained no compound of the formula (I).

| Example UPES-ATH | Scratch resistance Delta L | Tensile strength $\sigma_M$ [MPa] | Elongation at break $\epsilon tB$ [%] |
|---|---|---|---|
| Z-UPES-1 | 1.43 | 24.6 | 6.8 |
| Z-UPES-2 | 1.28 | 24.8 | 7.2 |
| Z-UPES-3 | 0.79 | 24.9 | 6.8 |
| Z-UPES-4 | 0.58 | 24.3 | 7.9 |
| Z-UPES-5 | 0.89 | 24.5 | 8.1 |
| Z-UPES-6 | 1.23 | 24.6 | 7.5 |
| Z-UPES-7 | 1.45 | 24.5 | 8.9 |
| Z-UPES-8 | 1.21 | 25.1 | 7.7 |
| Z-UPES-9 | 1.09 | 25.3 | 7.9 |
| Z-UPES-10 | 0.89 | 25.6 | 8.1 |
| Z-UPES-11 | 0.97 | 25.7 | 8.5 |
| Z-UPES-12 | 0.96 | 25.8 | 7.6 |
| Z-UPES-13 | 0.95 | 24.9 | 8.1 |
| Z-UPES-14 | 0.94 | 26.1 | 8.0 |
| Z-UPES-15 | 1.22 | 26.0 | 7.5 |
| Z-UPES-16 | 1.09 | 25.0 | 7.2 |
| Z-UPES-17 | 1.06 | 24.8 | 7.9 |
| Z-UPES-18 | 2.08 | 24.1 | 5.1 |

(Null Sample)

The values show the marked improvement in the scratch resistance of the compositions according to the invention.

The invention claimed is:

1. A polymer composition, comprising:
   a) a solid particle,
   b) at least one polymer selected from the group consisting of a thermoplast and a duromer,
   c) 0.05 to 10 wt. % based on the total weight of the composition of a compound of formula (I),

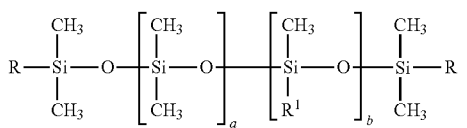

where
R identically or differently is R$^1$ methyl, or hydroxy,
R$^1$ identically or differently is a polyether residue of formula (III)

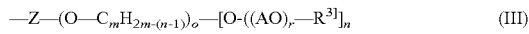

where
Z is a branched alkylene residue or an unbranched alkylene residue with 2 to 4 carbon atoms,
m is from 2 to 4,
n is from 1 to 3,
o is from 0 or 1,
AO is independently an oxyalkylene residue selected from the group consisting of an oxypropylene residue, an oxybutylene residue, and a combination of oxypropylene residue and oxybutylene residue, each of which optionally includes an oxytheylene residue,
R$^3$ is hydrogen,
and with the proviso that in R$^1$ a sum of carbon and oxygen atoms is at least 70,
with the proviso that r has a value that, taken together with m and n, provides said group R$^1$ with a total number of carbon atoms and oxygens atoms of at least 70,
a is from 20 to 200,
b is from 1 to 50,
with the proviso that if none of residues R is equal to R$^1$, b is at least 3, and
d) optionally further components.

2. The polymer composition according to claim 1, wherein
R$^1$ identically or differently is a —(CH$_2$)$_p$—O-EO$_x$—PO$_y$—BO$_z$—R$^3$,
with the proviso that in R$^1$ the sum of carbon and oxygen atoms is at least 70, and
EO is oxyethylene,
PO is oxypropylene,
BO is oxybutylene,
x is from 0 to 20,
y is from 5 to 100,
z is from 0 to 20,
p is from 2 to 4,
and R$^3$ is as defined in claim 1.

3. The polymer composition according to claim 1, wherein a numerical ratio of a to b is from 8:1 to 18:1.

4. The polymer composition according to claim 2, wherein x is between 0.05 and 1.2 times a sum of y and z.

5. The polymer composition according to claim 1, wherein the solid particle is a colouring pigment particle.

6. The polymer composition according to claim 1, wherein has been treated with the at least one compound of the formula (I) before mixing with component b), and the solid particle excludes a titanium dioxide particle, a barium sulphate particle, a zinc sulphide particle, and a lithopone particle.

7. The polymer composition according to claim 6, which comprises 0.01 to 3 wt. % of the at least one compound of the formula (I) based on a particle mass as part of the polymer composition.

8. The polymer composition according to claim 1, wherein the solid particle is an aluminum trihydrate (ATH) particle or a magnesium hydroxide (MDH) particle.

9. The polymer composition according to claim 1, which exhibit a decrease in water absorption of 25% compared to a polymer composition which does not contain the compound of the formula (I).

10. The polymer composition according to claim 1, which has an MFI which lies at least 10% above an MFI which was determined with the same composition which comprises the same solid particle in non-surface-treated form.

11. A method for retarding a flame, comprising contacting the polymer composition according to claim 1 with the flame, wherein the polymer composition comprises an aluminum trihydrate (ATH) particle or a magnesium hydroxide (MDH) particle.

12. The polymer composition according to claim 8, which is better by at least one UL 94 fire class, compared to a polymer composition which does not contain the at least one compound of the formula (I).

13. A process for treating a surface of a primary particle, comprising contacting the primary particle with at least one compound of
formula (I)

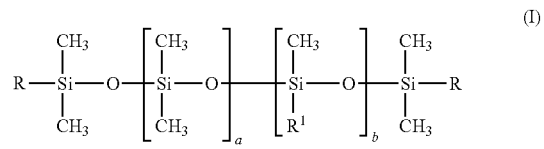

where
R identically or differently is R$^1$, methyl or hydroxy,
R$^1$ identically or differently is a polyether residue of the formula (III)

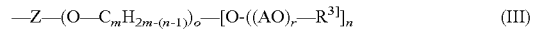

where
Z is a branched alkylene residue or an unbranched alkylene residue with 2 to 4 carbon atoms,
m is from 2 to 4,
n is from 1 to 3,
o is from 0 or 1,
AO is independently an oxyalkylene residue selected from the group consisting of an oxypropylene residue, an oxybutylene residue, and a combination of oxypropylene residue and oxybutylene residue, each of which optionally includes an oxyethylene residue,
R$^3$ is hydrogen,
and with the proviso that in R$^1$ a sum of carbon and oxygen atoms is at least 70,
with the proviso that r has a value that, taken together with m and n, provides said group R$^1$ with a total number of carbon atoms and oxygens atoms of at least 70,
a is from 20 to 200,
b is from 1 to 50,
with the proviso that if none of the residues R is equal to R$^1$, b is at least 3,
wherein 0.01 to 2 wt. % of the at least one compound of the formula (I) is contacted with the primary particle, based on a mass of the primary particle to be treated, and the primary particle excludes a titanium dioxide particle, a barium sulphate particle, a zinc sulphide particle, and a lithopone particle.

14. A polymer composition, comprising:
a) a solid particle,
b) at least one polymer, which is a thermoplast selected from the group consisting of polyethylene, polypropylene, polyamide, polystyrene, and blends thereof, or a duromer, which is a silicone resin or a urea resin,
c) at least one compound of formula (I),

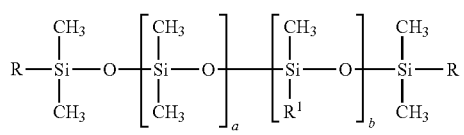

where
R identically or differently is $R^1$, methyl, or hydroxy,
$R^1$ identically or differently is a polyether residue of formula (III)

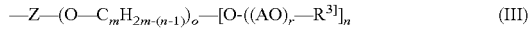

where
Z is a branched alkylene residue or an unbranched alkylene residue with 2 to 4 carbon atoms,
m is from 2 to 4,
n is from 1 to 3,
o is from 0 or 1,
AO is independently an oxyalkylene residue selected from the group consisting of an oxypropylene residue, an oxybutylene residue, and a combination of oxypropylene and oxybutylene, each of which optionally includes an oxyetheylene residue,
$R^3$ is hydrogen,
and with the proviso that in $R^1$ a sum of carbon and oxygen atoms is at least 70,
with the proviso that r has a value that, taken together with m and n, provides said group $R^1$ with a total number of carbon atoms and oxygens atoms of at least 70,
a is from 20 to 200,
b is from 1 to 50,
with the proviso that if none of the residues R is equal to $R^1$, b is at least 3, and
d) optionally further components.

15. The polymer composition according to claim 14, wherein the thermoplast is polypropylene.

* * * * *